United States Patent [19]

Helser et al.

[11] 3,902,913

[45] Sept. 2, 1975

[54] HYDROUS CALCIUM SILICATE INSULATION PRODUCTS

[75] Inventors: Jerry L. Helser, Hebron; Richard F. Shannon, Lancaster, both of Ohio

[73] Assignee: Owens-Corning Fiberglas Corporation, Toledo, Ohio

[22] Filed: Sept. 10, 1973

[21] Appl. No.: 395,887

Related U.S. Application Data

[63] Continuation-in-part of Ser. No. 248,376, April 28, 1972, Pat. No. 3,794,505.

[52] U.S. Cl................................. 106/120; 106/119
[51] Int. Cl.............................................. C04b 1/00
[58] Field of Search...................... 106/119, 120, 63

[56] References Cited
UNITED STATES PATENTS

| | | | |
|---|---|---|---|
| 2,665,996 | 1/1954 | Kalousek | 106/120 |
| 2,699,097 | 1/1955 | Binkley | 106/120 |
| 2,904,444 | 9/1959 | Hoopes et al. | 106/120 |
| 3,472,668 | 10/1969 | Pfeifer et al. | 106/120 |
| 3,661,603 | 5/1972 | Nicol | 106/99 |

FOREIGN PATENTS OR APPLICATIONS

| | | | |
|---|---|---|---|
| 654,367 | 6/1951 | United Kingdom | 106/120 |
| 249,577 | 12/1969 | U.S.S.R. | |

OTHER PUBLICATIONS

Budnikov et al., Izvestiya Akademil Navk SSSR, Neorganicheskie Materialy, Vol. 1, No. 7, pp. 1210–1214, July, 1965, "Increasing the Strength of Glass Fiber in a Medium of Hardening Cement Block."

Ur'ev et al., Poklady Akademii, Navk SSSR, Vol. 177, No. 6, pp. 1404–1406, December, 1967, "Some Characteristics of the Breakdown Mechanism of Glass Fibers Under Crystallization Conditions of New Growths from an Active Medium."

*Primary Examiner*—Delbert E. Gantz
*Assistant Examiner*—James W. Hellwege
*Attorney, Agent, or Firm*—Carl G. Staelin; John W. Overman; Patrick P. Pacella

[57] ABSTRACT

Hydrous calcium silicate insulation products reinforced with a particular combination of organic fibers and alkali-resistant glass fibers are disclosed.

5 Claims, No Drawings

HYDROUS CALCIUM SILICATE INSULATION PRODUCTS

This is a continuation-in-part application of U.S. Pat. Application, Ser. No. 248,376, filed Apr. 28, 1972, now U.S. Pat. No. 3,794,505.

This invention relates to hydrous calcium silicate insulation products.

The term hydrous calcium silicate denotes a crystalline compound formed by the reaction of lime (CaO), silica ($SiO_2$), and water ($H_2O$). The two hydrous calcium silicates that generally are of interest are: tobermorite having the formula $4 CaO . 5 SiO_2 . 5 H_2O$; and xonotlite, having the formula $5 CaO . 5 SiO_2 . X H_2O$. Hydrous calcium silicate products often are used as heat insulation materials.

Methods for reacting and drying a molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, and removing the products from the autoclave. Another such method includes placing a molded slurry of the reactive cementitious constituents and reinforcing fibers in an autoclave, introducing pressurized saturated steam into the autoclave to indurate the slurry, simultaneously further indurating and drying the slurry with superheated steam to convert the slurry to a final product, reducing the pressure in the autoclave to atmospheric pressure, and removing of the product.

The art has long attempted to produce a product using a dispersion of organic fibers in processes prior to the present invention, but all such attempts have resulted in a product that has far less strength than equivalent products when made using asbestos fibers. Prior to the present invention, the art has not known why organic fibers give a product having poor strength, but it was throught that the lack of strength was due to the physical differences between organic fibers and asbestos fibers.

We have discovered that a much stronger product is achieved when a combination of organic fibers and alkali-resistant glass reinforcing fibers are incorporated into the cementitious slurry.

Accordingly, the principal object of the present invention is the provision of a calcium silicate hydrate insulation product made by a commercial process which is as strong or stronger than prior art insulation material comprising asbestos fibers.

Other objects, aspects and advantages of this invention will be apparent to one skilled in the art from the following disclosure and appended claims.

In practice the principal slurry constituents, i.e. calcareous and siliceous materials, reinforcing fibers and water are mixed to form a slurry which is then molded to impart a predetermined shape to the slurry and final product. The slurry is molded or shaped in any convenient manner. Generally, however, one of two types of molds is employed, i.e. pan molds or filter press molds. In pan molds, the slurry remains in the mold while the cementitious materials are reacted to convert them to a hydrous calcium silicate insulation. A pan mold generally defines a mold cavity of a particular shape and dimension; e.g. a flat rectangular pan is used to form flat ware or blocks, while an arcuate, generally U-shaped mold forms half-section insulation pieces used to form molded pipe covering for insulating pipes, ducts, and the like. The filter press mold generally comprises a perforated molding surface over which the slurry is poured. A perforated mechanical piston, complementary in shape to the mold, compresses the slurry and dewaters it to the point where it is self-supporting. The filter press molding technique is described in U.S. Pat. No. 2,699,097 and is used to form pipe covering and flat ware.

One method disclosed herein introduces pressurized, saturated steam into a closed system or autoclave in sufficient amount to bring the pressure in the autoclave to 100 to 350 psi at a temperature ranging from 328° – 406°F. in 30 minutes or less and preferably within 15 to 30 minutes after the introduction of the steam begins. (The term "pressure" as used herein refers to gauge pressure (in pounds per square inch), i.e. the pressure above that of the atmosphere.)

The slurry is then maintained under this steam pressure in the autoclave for a period of time sufficient to indurate the slurry. After the product has been removed from the autoclave, it can be dried in an auxiliary drier, if required. The drying temperature in the auxiliary drier must be below the decomposition point of the organic fiber reinforcement to achieve best possible strength of the product.

The other method disclosed herein introduces presurized, saturated steam into a closed system or autoclave in sufficient amount to bring the pressure in the autoclave to 100 to 350 psi in 30 minutes or less and preferably within 15 to 30 minutes after the introduction of the steam begins. (The term pressure as used herein refers to gauge pressure (in pounds per square inch), i.e. the pressure above that of the atmosphere.) After the introduction of the steam, the temperature in the autoclave is raised by heating coils to temperature ranging from about 407° to about 600°F. to produce the superheated steam.

The slurry is then maintained in the autoclave until a predetermined percentage of the moisture (by weight) of the ware has been removed by evaporation into the superheated steam atmosphere. The free moisture is reduced substantially during the cycle, but never drops below 10% by weight of solids during the entire cycle. While continuing to circulate the steam in the system, the pressure in the autoclave is reduced to atmosphere conditions within 60 minutes or less and the final product is removed. The product subsequently can be dried in an auxiliary drier, if required. The drying temperatures in the auxiliary drier must be below the decomposition point of the organic fiber reinforcement, or a brittle product is obtained. The retention of at least 10% by weight-free moisture in the molded slurry allows for simultaneous indurating and drying in an autoclave at temperatures above the decomposition point of the reinforcing organic fibers.

The specific lime to silica ratio of the slurry is dependent primarily upon the desired type of crystalline hydrous silicate desired in the final product. For example, if it is desired in obtain a crystalline product predominantly composed of a crystalline matrix structure of the type commonly referred to as xonotlite ($5 CaO . 5 SiO_2 . X H_2O$), a $CaO/SiO_2$ mol ratio of approximately 1/1 would be utilized in the slurry. If the desired crystalline produce is tobermorite having the formula 4 CaO . 5

$SiO_2 \cdot 5 H_2O$, a $CaO/SiO_2$ mol ratio ranging from 0.75/1 to 0.80/1 would be employed in the slurry. In general, the $CaO/SiO_2$ molar ratio ranges from 0.65/1 to 1.3/1.

Control of the density of the resultant pan product is primarily accomplished by controlling the relative amount of water utilized in the make-up of the slurry. For example, an apparent density of 11 pounds per cubic foot, which may be considered a nominal apparent density, would be obtained utilizing a slurry having a ratio of water to total dry soldis of approximately 6:1.

The siliceous materials employed in this invention include portland cement, siliceous sand, quartz, diatomaceous earth, clays, silica gel, pozzolana, perlite, and the like and mixtures thereof.

The calcareous materials used in this invention include portland cement, quick lime, slaked lime and the like and mixtures thereof.

The organic materials of this invention are cellulosic fibers such as fibers of pulp fiber, cotton, straw, bagasse, wood flour, hemp, rayon and the like. A preferred pulp fiber is bleached softwood pulp.

Alkali-resistant glass fibers that can be employed with the cellulose material include those disclosed in British Patent Specification Nos. 1,243,972 and 1,290,528 and in U.S. patent application Ser. No. 275,613 filed on July 27, 1972. The $ZrO_2$ and $TiO_2$ containing compositions described in application Ser. No. 275,613 provide a unique combination of alkali-resistance, low liquidus temperature and desirable viscosity for the fiberization of glass compositions and for the reinforcement of cementitious materials. The glass compositions of application Ser. No. 275,613 have the following range of proportions by weight: $SiO_2$, 60 to 62%; CaO, 4 to 6%; $Na_2O$, 14 to 15%; $K_2O$, 2 to 3%; $ZrO_2$, 10 to 11%; and $TiO_2$, 5.5 to 8%.

The organic materials generally have a fiber diameter of 30 microns or less, as in the case of cotton fibers, and may average less than 1 micron in fiber diameter as in the case of wood pulp. The glass fibers will generally have a diameter of less than 0.001 inch. The glass fibers have a length from 0.25 to 2.0 inch, desirably from 0.5 to 1.25 inch, and preferably from 0.625 to 1.00 inch.

The hydrous calcium silicate insulation materials generally will have a density between 10 and 20 pounds per cubic foot and comprise the following materials in percent by weight of solids:

| Materials | Percent |
| --- | --- |
| Organic Fibers | 1.0 to 20.0 |
| Glass Fibers | 0.1 to 10.0 |
| Hydrous Calcium Silicate | 60.0 to 95.0 |
| Fillers | 0 to 20.0 |

Preferably, the amount of organic fibers ranges from 5 to 10 percent by weight of solids and the amount of glass fibers ranges from 0.5 to 2.5 percent by weight of solids.

Specific composites and processes embodying the principles of this invention are set forth in the following examples.

EXAMPLE I

A low density hydrated calcium silicate heat insulation material is made from the following materials in part by weight of solids:

| Materials | Parts by Weight |
| --- | --- |
| Hydrated lime | 45.2 |
| Diatomaceous earth (86 sq. ft. per gram) | 22.6 |
| Diatomaceous earth (54 sq. ft. per gram) | 22.6 |
| Wood pulp (Sulfate type pulp) | 8.5 |
| Chopped glass fibers | 1.0 |
| Aluminum sulfate | add as required to control alkalinity |

A dispersion of the various materials is made by dispersing the wood pulp and the aluminum sulfate in 350 parts by weight of water heated to 200°F. in a hydrapulper to produce a dispersion. This dispersion of the wood pulp is then added to a premixer wherein the hydrated lime is added and mixed for 1 minute. Another 900 parts by weight of water at 200°F. is added to another premixer and the diatomaceous earth is added thereto and mixed for 1 minute. Thereafter the contents of the two premixers are added to a gel tank wherein the materials are thoroughly mixed for 10 minutes. The resulting slurry or suspension of ingredients is then permitted to gel quiescently for 10 minutes and is then slowly stirred in the gel tank for 2 minutes. Thereafter the partially formed gel is again allowed to remain quiescent for a period of 10 minutes followed by another period of slow stirring of approximately 2 minutes. The gel so produced is then allowed to sit for 80 minutes before being drawn off in small quantities to a volumetric tank in precise quantities for charging a precision type filter mold shaped to make 3 inch annular pipe insulation of 1½ inch wall thickness and a length of 36 inches. The ram of the mold compresses the gel to force the water out through the cylindrical filter forming the inside surface of the pipe insulation to leave a pipe insulation which is self sustaining and handleable. The pipe is then removed from the filter mold and is stacked in a rack which when filled is rolled into an autoclave for induration. After the autoclave is sealed, the pressure in the autoclave is raised to 175 psi over a 30-minute cycle and the pipes are subjected to saturated steam at this pressure for 1½ hours. Thereafter the temperature in the autoclave is raised by heating coils to 600°F. to produce superheated steam which slowly dries the pipes over another two-hour period. The autoclave is then depressurized over a ½-hour period, and the racks which hold the insulation block are removed from the autoclave. The material so produced has a modulus of rupture of 115 psi and a density of 12.5 lbs. per cubic foot.

By way of comparison, a prior art material made from asbestos using the same parts by weight of diatomaceous earth and hydrated lime, and devoid of the cellulose fibers and the soluble aluminum material has a modulus of rupture of only approximately 95 psi. The modulus of rupture is determined according to the ASTM Specification C 446–64.

The glass fibers used in the above product are resistant to calcium hydroxide attack. As far as applicants are aware, only zirconia fibers i.e. fibers having 2½% or more of $ZrO_2$ will withstand autoclaving with lime. A $ZrO_2$ content of 2½% may be acceptable in low pressure autoclaving i.e. 175 psi or less, in high temperature autoclaving i.e. above 450°F., 5% or more may be necessary. Examples of Zirconia glasses are disclosed in British Pat. No. 1,243,972.

The fibers were made by drawing molten glass from a bushing having 204 orifices therein into individual fibers having a diameter of approximately 0.00055 inch. These individual fibers were coated with an aqueous solution of a water soluable polyvinyl acetate and were gathered into a strand that was coiled into a package and dried. The strand had approximately ½% of polyvinyl acetate thereon based on the weight of the dried coated fibers. These fibers were chopped into one inch lengths before dispersing in the water.

The wood pulp used above is a chlorine bleached sulfate pulp. Sulfate pulp generally includes approximately 0.1% of aluminum sulfate thereon. The soluble aluminum sulfate is used in a quantity sufficient to change the basic negative charge on the fibers to a positive charge. This is highly beneficial in that the positively charged fibers disperse readily in water, and are drawn to the negatively charged particles of diatomaceous earth to surround the same. In addition, the positively charged fibers repel the positively charged calcium ions and leave the hydroxyl ions free to migrate to the particles of diatomaceous earth. Cellulose fibers treated with soluble aluminum compounds are therefore a highly desirable form of cellulose fibers for use in the present invention. Other types of cellulose fibers which are treated to become positively charged, are also a preferred fiber material. In those instances where the cellulose fibers are not pretreated before dispersing in the water, cations may be used in the batch formulation to accomplish generally the same result.

EXAMPLE II

A crystalline hydrous calcium silicate insulation product was made from the following materials:

| Materials (Filter Press) | Dry Weight Percent |
|---|---|
| Glass Fiber | 1.3 |
| Wood Pulp | 8.8 |
| Hydrated Lime | 45.0 |
| Diatomaceous Earth | 45.0 |
| | 100.1 |

A dispersion of the various materials was made in water at a temperature of about 200°F. with a water-to-solids ratio of 14.3/1. The dispersion was made in a hydrapulper and thereafter added to a gel tank and thoroughly mixed. The resulting slurry then was alternately allowed to remain quiescent and slowly stirred for short periods of time. The gel so produced then was allowed to stand for about 1 hour. The gel was charged to a precision type filter mold shaped to make pipe insulation with a wall thickness of 1 inch. A ram in the mold compresses the gel to force the water out through a cylindrical filter forming the inside surface of the pipe insulation. The pipe insulation now has a water-to-solids ratio of 4.0 to 4.5/1 and can be handled. The insulation was placed in an autoclave. After the autoclave was sealed, the pressure in the autoclave was raised to 250 psi over a 15-minute cycle and the insulation was subjected to saturated steam at this pressure for 90 minutes to indurate the insulation. The temperature in the autoclave then was raised by heating coils to 540°F. to produce superheated steam, which slowly indurated and dried the insulation over a 125-minute period. The autoclave then was depressurized over a ½-hour period and the insulation was removed from the autoclave. The insulation so produced had a free-moisture content of at least 10 percent by weight of solds and a modulus of rupture of 97 psi.

The glass fibers used in the above product were resistant to calcium hydroxide attack. The glass fibers had a diameter of approximately 0.00055 inches and were chopped into 1 inch lengths. The wood pulp employed was bleached softwood pulp.

A comparison of these examples demonstrates that hydrous calcium silicate insulation products of this invention are as strong or stronger than prior art insulation material employing asbestos fiber.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. Hydrous calcium silicate insulating products comprising the following materials in percent by weight of solids:

| Materials | Percent By Weight |
|---|---|
| Organic Fibers | 1.0 to 20.0 |
| Glass Fibers | 0.1 to 10.0 |
| Hydrous Calcium Silicate | 60.0 to 95.0 |
| Fillers | 0 to 20.0 | wherein the organic fibers are cellulose fibers and the glass fibers are alkali-resistant glass fibers.

2. Insulation products according to claim 1 wherein the amount of organic fibers ranges from 5 to 10 percent by weight of solids and the amount of glass fibers ranged from 0.5 to 2.5 percent by weight of solids.

3. Insulation products according to claim 1 wherein the organic fibers are bleached wood pulp and the glass fibers are zirconia glass fibers.

4. Insulation products according to claim 1 wherein the hydrous calcium silicate is tobermorite, zonotlite or a mixture thereof.

5. Insulation products according to claim 1 having a density between 10 and 20 pounds per cubic foot.

* * * * *